US006891061B1

(12) United States Patent
Nishimura et al.

(10) Patent No.: US 6,891,061 B1
(45) Date of Patent: May 10, 2005

(54) PACKED COLUMN AND POLYMERIZABLE COMPOUND TREATING METHOD USING THE SAME

(75) Inventors: Takeshi Nishimura, Himeji (JP); Yukihiro Matsumoto, Kobe (JP); Sei Nakahara, Himeji (JP); Osamu Dodo, Ibo-gun (JP)

(73) Assignee: Nippon Shokubai Co. Ltd., Osaka (JP)

( * ) Notice: Subject to any disclaimer, the term of this patent is extended or adjusted under 35 U.S.C. 154(b) by 708 days.

(21) Appl. No.: 09/688,169

(22) Filed: Oct. 16, 2000

(30) Foreign Application Priority Data

Oct. 20, 1999 (JP) ............................................ 11-297856

(51) Int. Cl.[7] .......................... C07C 67/48; C07C 51/42
(52) U.S. Cl. ...................................... 560/218; 562/600
(58) Field of Search ........................ 560/218; 562/600; 203/60, 61; 210/696

(56) References Cited

U.S. PATENT DOCUMENTS

| 4,814,117 A | * | 3/1989 | Leva ........................... 261/94 |
| 5,296,205 A |   | 3/1994 | Hardison |
| 6,620,969 B1 | * | 9/2003 | Nishimura et al. ......... 562/600 |

FOREIGN PATENT DOCUMENTS

EP        0 719 578 A1    7/1996
JP        03127606        5/1991

OTHER PUBLICATIONS

"Chemical Engineers' Handbook, 5th Edition", Edited by Robert H. Perry, et al., p. 18–25, 18–29, 18–30 ; and Kagaku Kougaku Binran (Chemical Engineers' Handbook), 5th Edition, Edited by Kagaku Kogaku Kyokai, p. 284–286) (Translation: No).

"Chemical Engineers' Handbook, 5th Edition", Edited by Robert H. Perry, et al., pp. 18–25, 18–29, 18–30; anc.

Kagaku Kougaku Binran (Chemical Engineers' Handbook), 5th Edition, Edited by Kagaku Kogaku Kyokai, pp. 284–286) (Translation: No).

* cited by examiner

Primary Examiner—Paul A. Zucker
(74) Attorney, Agent, or Firm—Nixon & Vanderhye, P.C.; Frank P. Presta

(57) ABSTRACT

Provided are a packed column arranged so as to be capable of effectively preventing polymerization of a polymerizable compound such as a (meth)acrylic acid in treating the compound, and a method for treating a polymerizable compound using the packed column. The packed column, which is provided with a packing support plate and is filled with a packing on the packing support plate, is arranged so as to include a packing layer (B) having a greater percentage of voids than that of a packing layer (A), between the packing support plate and the packing layer (A).

7 Claims, 3 Drawing Sheets

PACKED COLUMN AND POLYMERIZABLE COMPOUND TREATING METHOD USING THE SAME

FIELD OF THE INVENTION

The present invention relates to a packed column and a polymerizable compound treating method using the packed column, and particularly relates to a packed column arranged so as to be capable of effectively suppressing polymerization of a polymerizable compound such as a (meth)acrylic acid in distillation or the like of the compound in order to ensure efficient distillation or the like of the same, as well as to the usage of the forgoing paced column.

BACKGROUND OF THE INVENTION

Since a compound such as a (meth)acrylic acid is extremely polymerizable, polymerization of the same often occurs in the production process, thereby unavoidably causing a halt of an apparatus due to the polymerization, as well known. To prevent this, a polymerization inhibitor such as hydroquinone or phenothiazine is used, or a molecular oxygen containing gas is applied.

In a producing process of a (meth)acrylic acid or the like, a packed column is used as a purifying device, but it is difficult to avoid polymerization of a polymerizable compound in the packed column. In a packed column, a flooding phenomenon in which a liquid to flow down does not flow down as a flow velocity of a gas is increased thereby causing the liquid to consequently overflow occurs more often on a support plate section, rather than in packing layers. Therefore, polymerization occurs more often on a support plate section, rather than in packing layers. Accordingly, openings in a support plate are usually arranged so as to be more than voids of a packing layer, that is, a ratio of a total area of openings to a column cross-sectional area is usually set more than a percentage of voids of a packing layer. Nevertheless a polymer formed causes the openings of the support plate to be plugged. In the case where a polymer is formed in the packed column and the openings of the support plate are plugged, the operation of the packed column is stopped and the polymer is removed manually or chemically.

SUMMARY OF THE INVENTION

An object of the present invention is to provide, by overcoming the foregoing problems, a packed column arranged so as to be capable of effectively preventing polymerization of a polymerizable compound such as a (meth)actylic acid when treating the compound, and a method of treating a polymerizable compound such as a (meth)acrylic acid using the foregoing packed column.

According to the research by the inventors of the present invention, the aforementioned problems can be solved by arranging packing layers provided on a packing support plate in a packed column so that a layer adjacent to the packing support plate should have a greater percentage of voids than those of the other layers. The present invention was completed based on the foregoing knowledge.

More specifically, to achieve the foregoing object, a packed column in accordance with the present invention is a packed column provided with a packing support plate so that a packing is disposed on the packing support plate, and is arranged so that a packing layer (B) having a greater percentage of voids than that of a packing layer (A) is provided between said packing support plate and said packing layer (A).

Furthermore, the present invention also relates to a method of treating a polymerizable compound using the foregoing packed column. Note that in the present invention the "treatment" refers to operations such as absorption, distillation, extraction, and stripping.

The foregoing arrangement ensures effective prevention of polymerization of a polymerizable compound such as a (meth)acrylic acid.

For a fuller understanding of the nature and advantages of the invention, reference should be made to in the ensuing detailed description taken in conjunction with the accompanying drawings.

DESCRIPTION OF THE PREFERRED EMBODIMENTS

The following description will explain an embodiment of the present invention, while referring to FIGS. 1 through 4.

Figure 4:
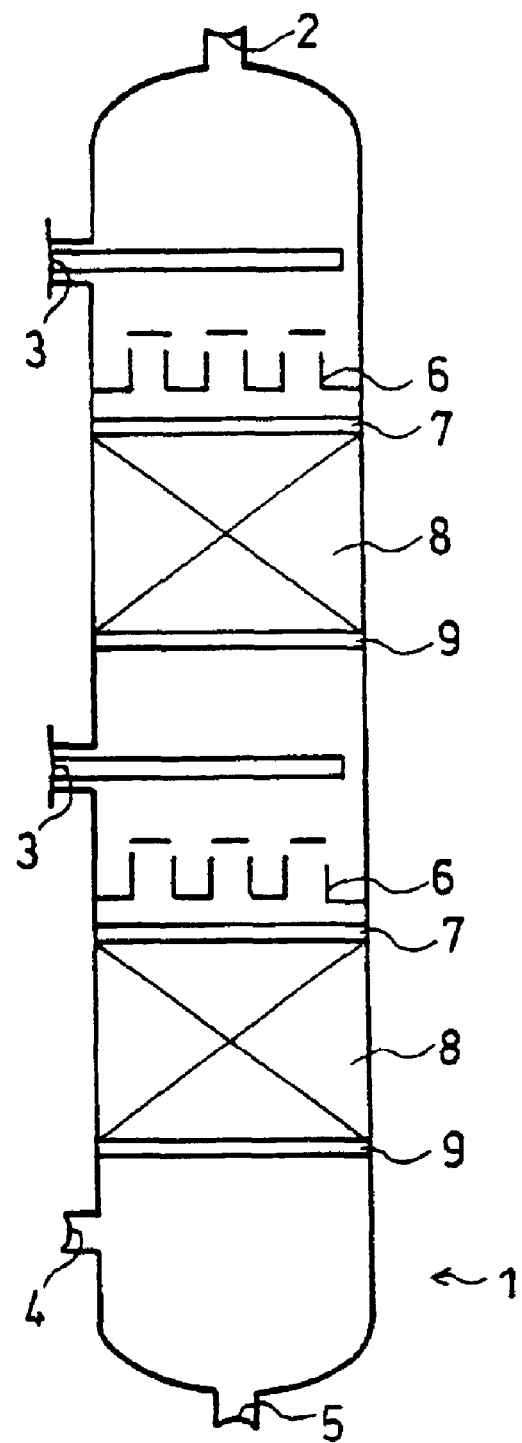
FIG. 4 is a schematically illustrating an arrangement of a conventional packed column.

FIG. 4 is a cross-sectional view schematically illustrating an arrangement of a conventional packed column. As shown in FIG. 4, a packed column 1 is equipped with a packing support plate 9, a packing layer 8, a hold-down grid 7, and a distributor 6 in the stated order from the bottom thereof. The packing layer 8 is formed by filling up a packing on the packing support plate 9 so that the packing should fill the inside of the packed column 1. The foregoing hold-down grid 7 is provided above the packing layer 8, so as to hold down the packing of the packing layer 8. The foregoing distributor 6 is provided above the hold-down grid 7, so as to cause liquid introduced through a liquid inlet 3 provided above the distributor 6 and/or liquid flowing down from the packing layer above the same to be distributed, and then, applied uniformly to the packing layer 8 via the hold-down grid 7.

The packing support plate 9, the packing layer 8, the hold-down grid 7, and the distributor 6 compose a unit, and at least one unit (two units in the case of FIG. 4) is provided in the packed column 1. Furthermore, the packed column 1 has a gas inlet 4 at a column bottom, that is, beneath the packing support plate 9. Gas (vapor) introduced through the gas inlet 4 is brought into contact with liquid introduced through the liquid inlet 3 and distributed by the distributor 6, and then, the gas is taken out through a gas outlet 2 provided at a column top of the packed column 1, while the liquid after contact with the gas is taken out through a liquid outlet 5 provided at the column bottom of the packed column 1.

In the case where, however, an operation such as absorption, distillation, extraction, or stripping of a polymerizable compound is carried out by means of the packed column 1 shown in FIG. 4, a flooding phenomenon tends to occur at the packing support plate 9 thereby causing polymerization of the polymerizable compound to occur at the packing support plate 9, clogging up openings in the packing support plate 9.

Therefore, a packed column in accordance with the present invention is provided with, in addition to a packing layer, an additional packing layer having a greater percentage of voids as compared with the foregoing packing layer, at a position in contact with a packing support plate. This ensures suppression of the flooding phenomenon at the packing support plate, and hence, prevention of polymerization.

Figure 1:
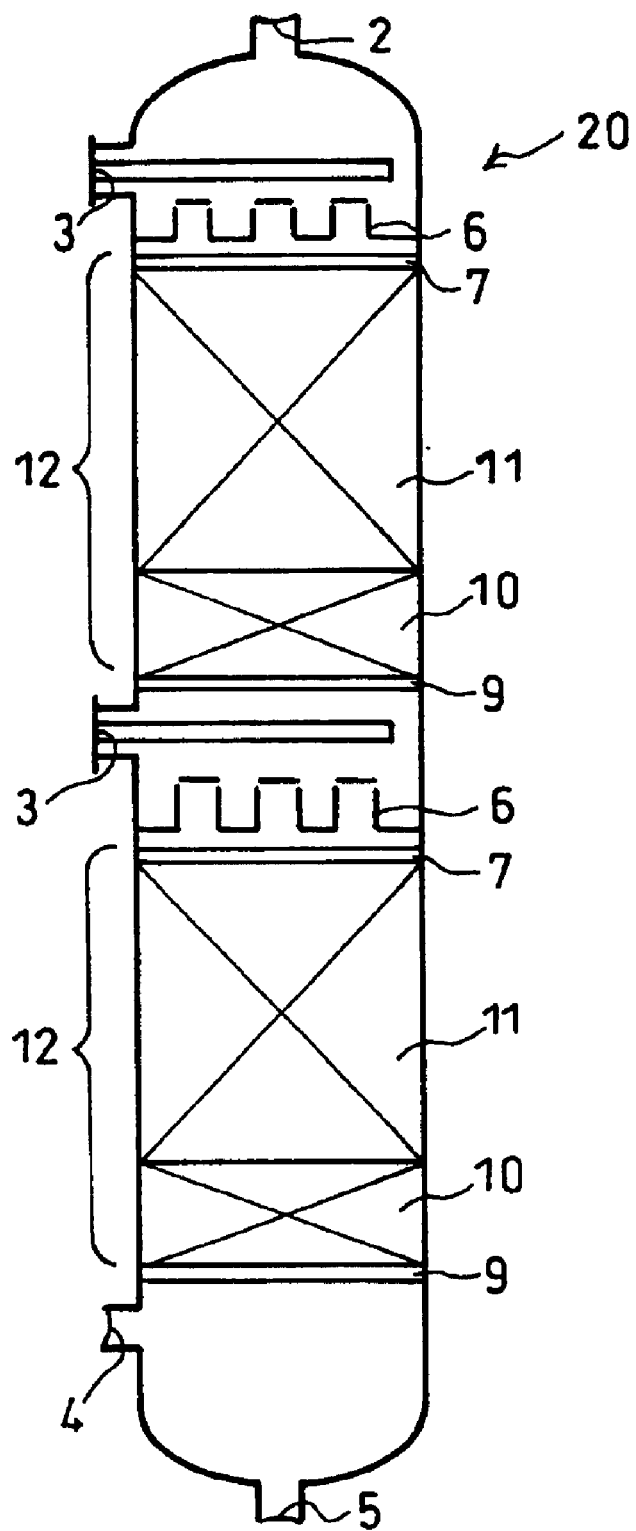
FIG. 1 is a cross-sectional view schematically illustrating an example of an arrangement of a packed column of the present invention.

FIG. 1 is a cross-sectional view schematically illustrating an example of an arrangement of the packed column of the present invention. A packed column 20 of the present invention includes a packing section 12 composed of two packing layers (a packing layer 11 as a first packing layer (A) and a packing layer 10 as a second packing layer (B)) that have different percentages of voids, respectively, in the place of the packing layer 8 shown in FIG. 4. More specifically, the packed column 20 of the present invention has the packing layer 10 on the packing support plate 9, and has the packing layer 11 on the packing layer 10. The packing layer 10 has a greater percentage of voids than that of the packing layer 11.

Incidentally, the packed column 20 of the present invention is, like the packed column 1 shown in FIG. 4, provided with the hold-down grid 7, the distributor 6, the liquid outlet 5, the gas inlet 4, the liquid inlet 3, and the gas outlet 2, which have respective functions identical to those explained in conjunction with the packed column 1.

As the foregoing packing support plate 9, a conventional packing support plate can be used. Examples of the conventional known packing support plate include a wire-mesh packing support plate, a corrugated packing support plate, etc. A typical corrugated-type packing support plate is shown in "Chemical Engineers' Handbook, 5th edition" ed. Perry, FIGS. 18–51.

Figure 2:
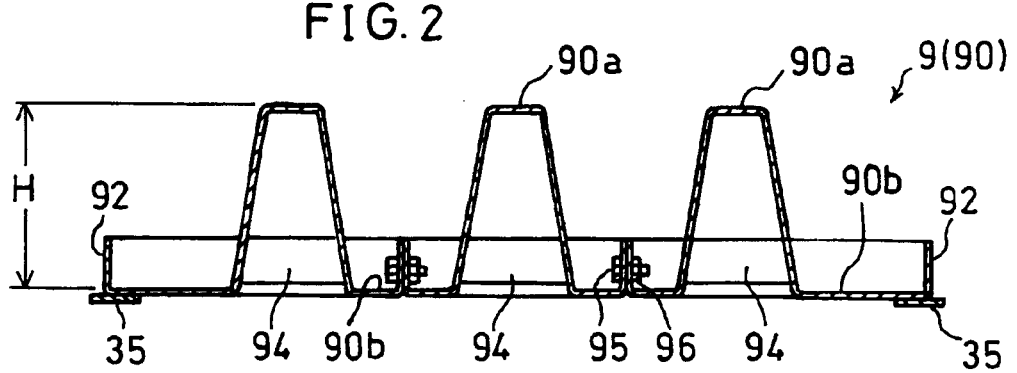
FIG. 2 is a cross-sectional view schematically illustrating an example of an arrangement of a corrugated packing support plate.

In the present invention, a corrugated packing support plate 90 is preferably adapted as the packing support plate 9, for the reason that polymerization can be more effectively prevented, and the like. FIG. 2 is a cross-sectional view explaining an example of the corrugated packing support plate 90. H in FIG. 2 is indicative of a height of a projection section 90a of the corrugated packing support plate 90. Incidentally, a support ring 35 in FIG. 2 is provided in the packed column so as to fix the corrugated packing support plate 90 to the packed column.

Figure 3:
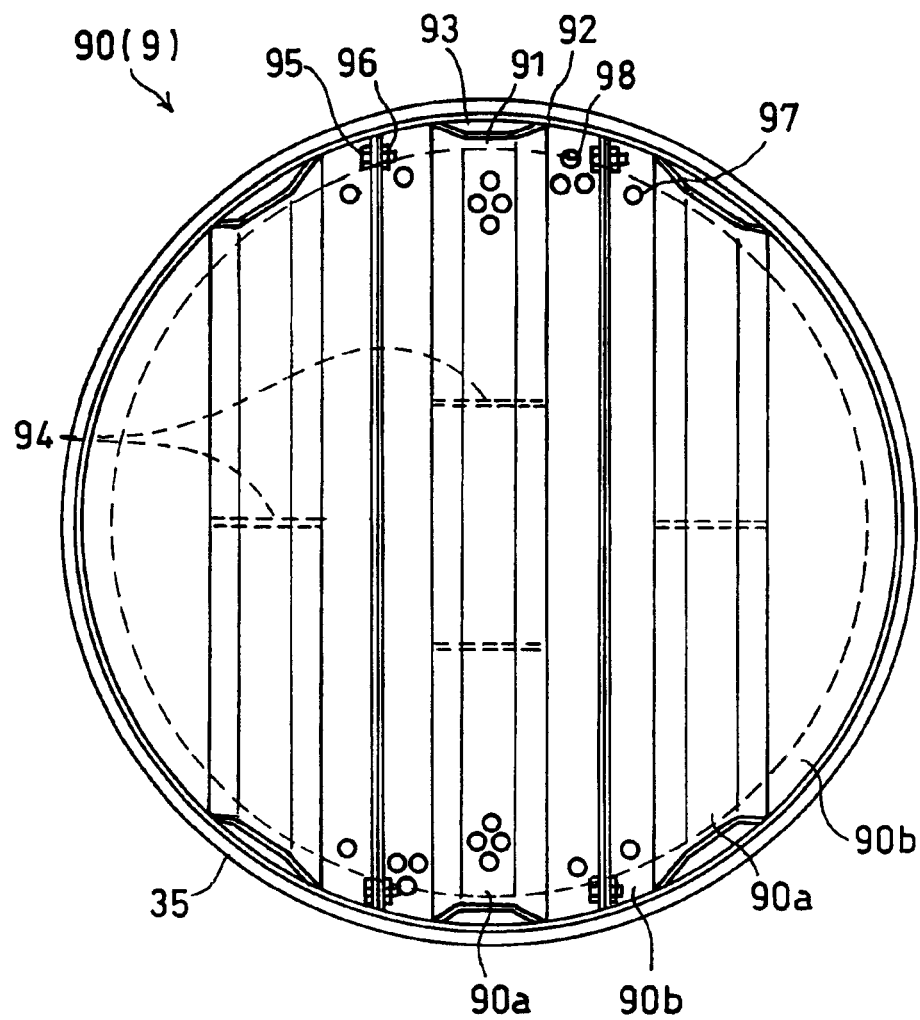
FIG. 3 is a plan view schematically illustrating an example of a corrugated packing support plate.

The following description will explain in more detail an arrangement of the corrugated packing support plate 90, while referring to FIGS. 2 and 3.

FIG. 3 is a plan view illustrating an arrangement of the corrugated packing support plate 90. As shown in FIG. 3, the corrugated packing support plate 90 is provided with a punching plates 91, a ring plate 92, end plates 93, stiffeners 94, bolts 95, nuts 96, and clamps 97.

The foregoing punching plates 91 are plates having openings 98, and form the projection sections 90a and recess sections 90b. Here, the recess sections 90b refer to parts between the projection sections 90a, as well as parts between the projection sections 90a and the ring plate 92. Incidentally, the corrugated packing support plate 90 shown in FIG. 3 is composed of three projection sections 90a and four recess sections 90b, but the projection sections 90a and the recess sections 90b may be provided as required, and the numbers thereof are not particularly limited. Openings 98 are provided throughout each punching plate 91, though in FIG. 3 only some openings 98 are shown and the rest are omitted. The ring plate 92 is a plate constituting a perimeter hem of the corrugated packing support plate 90. The end plates 93 are plates constituting end surfaces of the projection sections 90a. The stiffeners 94 are plates provided for reinforcing the projection sections 90a. The clamps 97 are provided for fixing the corrugated packing support plate 90 to the support ring 35 disposed in the packed column. The corrugated packing support plate may be arranged so as to be composed of several divisions, taking into consideration the workability and the like for maintenance. In such a case, the divisions are fixed to each other with use of bolts 95 and nuts 96.

As shown in FIG. 2, each stiffener 94 is a plate provided substantially vertical to the corrugated packing support plate 90. Therefore, the stiffener 94 does not affect an area of the openings 98. Incidentally, the stiffeners 94 may be provided as required so as to reinforce the projection sections 90a, and the number thereof is not particularly limited.

Among the corrugated packing support plates 90 thus arranged, more preferably adapted is a corrugated packing support plate 90 that is arranged so that a sum of areas of the openings 98 (hereinafter referred to as "total opening area") is in a range of 110% to 150% of a column cross-sectional area, and an area of each opening 98 is in a range of 25 mm$^2$ to 2000 mm$^2$. The total opening area is more preferably in a range of 120% to 130%. Furthermore, the area of each opening 98 is more preferably in a range of 75 mm$^2$ to 700 mm$^2$. Note that in the present invention the "column cross-sectional area" refers to an area of a cross section of the packed column 20 taken along a plane parallel to the packing support plate 9.

The shape of the opening 98 is not particularly limited to a circle, but it may be any shape such as a rectangle or an ellipse as long as the opening 98 has an area in the foregoing range. The openings 98 may have the uniform shape or may have different shapes from each other. In the case where the opening 98 has an excessively small area, passage of liquid is hindered, and therefore the liquid becomes retained for a longer term, thereby allowing polymerization. On the other hand, in the case where the opening 98 has an excessive large area, the number of the openings decreases, and therefore, channeling tends to occur. Consequently, the flooding phenomenon tends to occur, and this leads to polymerization. To increase the total opening area, it is necessary to heighten the projection section 90a, and this possibly leads to the lowering of strength of the corrugated packing support plate 90. In other words, by setting the total opening area and the area of the opening 98 in the foregoing respective ranges, it is possible to make the corrugated packing support plate 90 let liquid through smoothly and excel in strength. This ensures more effective suppression of polymerization.

The manner how the foregoing openings 98 are provided is not particularly limited, but they are preferably provided uniformly throughout the whole corrugated packing support plate 90. In the case where they are provided uniformly throughout the whole corrugated packing support plate 90, channeling comes to hardly take place, and this results in suppression of the flooding phenomenon. This leads to elimination of retainment of liquid, and hence, to prevention of polymerization.

The type of the corrugated packing support plate 90 is not particularly limited, and any one may be adequately selected from among those which have openings 98 satisfying the foregoing requirements.

A percentage of voids of the packing layer 11 is not particularly limited, but it is preferably in a range of 65% to 99.5%, and more preferably in a range of 75% to 99%. A percentage of voids of the packing layer 10 is not particularly limited as long as it is greater than a percentage of voids of the packing layer 11. However, the former is preferably greater than the latter by 0.1% to 30%, or more preferably by 0.2% to 10%.

By making the percentage of voids of the packing layers 10 and 11 in the foregoing respective ranges, it is possible to lower a liquid-vapor load and a liquid holdup. Consequently, it is possible to suppress the flooding phenomenon, thereby effectively suppressing polymerization.

To make the packing layer 10 have a greater percentage of voids than the percentage of voids of the packing layer 11, a packing having a nominal size greater than that of a packing (a) constituting the packing layer 11 may be used as a packing (b) constituting the packing layer 10, for example.

Nominal sizes of packings are, for example, described in Table 5.8, p. 284 and following pages, "Kagaku Kougaku Binran", 5th edition. Generally, comparing packing layers of the same type made of the same material, a packing layer having a greater nominal size has more voids. In the case of comparing those of different types made of different materials, percentages of voids can be calculated according to the following expressions based on a bulk density. The bulk density is a weight of a packing per unit volume, and it generally decreases as the nominal size of the packing increases, with voids of the packing layer increasing.

VOIDS (%) = [1 − (BULK DENSITY(kg/m$^3$)/

DENSITY OF PACKING MATERIAL(kg/m$^3$))] × 100

For example, in the case of Cascade mini rings (trade name: available from Dodwell and Co., Ltd.) available in the market, their nominal sizes are No.0P, No.1P, No.1.5P, No.2P, No.2.5P, No.3P, etc. (in a nominal size ascendent order). For example, in the case where the No.2P is used as the packing (a), the No.3P that is higher by one or two ranks as compared with the No.2P, that is, that has a greater nominal size that of the No.2P, for example, may be used as the packing (b).

Incidentally, the size of the packing (a) may be appropriately determined according to the column diameter of the packed column 20 of the present invention.

A length (height) of the packing layer 10 may be set to a length sufficient to suppress the flooding phenomenon at the packing support plate 9. Generally, however, a greater HETP (height equivalent to a theoretical plate) is required to obtain more voids, thereby causing the packed column to become higher, and this is uneconomical. For instance, in the case where the packing support plate 9 is a wire-mesh-type packing support plate, the height of the packed layer 10 is preferably in a range of 50 mm to 500 mm, or more preferably in a range of 200 mm to 300 mm. Furthermore, in the case where the packing support plate 9 is the corrugated packing support plate 90, the packing layer 10 preferably has a length such that a top of the projection sections on the corrugated packing support plate 90 are not seen. In other words, the length of the packing layer 10 is preferably substantially equal to or greater than a height of the projection sections 90a of the corrugated packing support plate 90. More specifically, the length of the packing layer 10 is preferably 1.1 times to 1.5 times, or more preferably 1.2 times to 1.4 times the height H of the projection sections 90a of the corrugated packing support plate 90.

The height of the projection sections 90a is not particularly limited as long as it is appropriately determined according to a strengthen required of the corrugated packing support plate 90 as the packing support plate 9, but it is preferably in a range of 100 mm to 600 mm, or more preferably in a range of 150 mm to 400 mm.

The shapes of the packings (a) and (b) of the packing layers 10 and 11 are not particularly limited, and they may be any ones selected from among balls, pellets, Rasching rings, Pall rings, Berl saddles, Cascade mini rings (trade name: available from Dodwell and Co., Ltd.), IMTP (trade name: available from Norton Co.). Moreover, the packings (a) and (b) do not have to necessarily be composed of the same packing, but may be composed of different packings, respectively. Furthermore, each of the packing layers 10 and 11 may be composed of a plurality of layers. Note that, in the case where the packing layer 10 is composed of a plurality of layers, they are arranged so that the layer adjacent to the support plate 9, among the plural layers, has the greatest percentage of voids.

As to a packing method, regularly packing is preferable, since it effectively prevents polymerization. From this viewpoint, preferably used are Cascade mini rings, IMTP, etc. that are, though being random packings, in shapes (flat shapes) such that they are horizontally laid when dropped from above. Since the packing is packed in a horizontal-laid state, the liquid is not retained on the packing, thereby making it possible to prevent polymerization. In the case of the foregoing random packings such as the Rasching rings and the Pall rings other than the Cascade mini rings and IMTP, they become vertically, obliquely, or horizontally laid when dropped from above, thereby being irregularly packed. Therefore, a liquid is retained, where polymerization occurs. Without using the packings in the shape (flat shape) such that they are horizontally laid when dropped from above upon packing, it is necessary to regularly place a packing piece by piece in order to prevent polymerization of a polymerizable compound. Incidentally, the foregoing regularly packing method is a method for packing random packing pieces in a certain direction regularly.

In the present invention, to effectively prevent polymerization, surface roughness of a part or an entirety of the packings (a) and (b) preferably has an Rmax of not more than 12.5S according to JIS B0601. In other words, an arrangement in which at least either the packing layer 10 or the packing layer 11 includes a packing whose Rmax indicative of a surface roughness is not more than 12.5S ensures effective prevention of polymerization.

The packed column of the present invention is suitably adapted to treat a polymerizable compound. A polymerizable compound is not particularly limited as long as it has a characteristic of becoming easily polymerized upon heating or the like, and examples of the same includes an organic compound having a vinyl group. Typical ones of the foregoing polymerizable compounds include (meth)acrylic acids and esters of the same. The esters of the same are, for example, methyl ester, ethyl ester, isopropyl ester, n-propyl ester, isobutyl ester, n-butyl ester, 2-hydroxyethyl ester, and N,N-dimethylaminoethyl ester. One of the polymerizable compounds may be used alone, or two or more of the same may be used in combination. In the method of the present invention, among these compounds, one may be treated alone, or some may be treated in a mixture form, or further, a liquid containing a single compound or a mixture of some may be treated.

The packed column of the present invention is capable of, in treating a polymerizable compound, preventing polymerization of the polymerizable compound effectively.

Therefore, the present invention ensures treatment of a polymerizable compound with use of the packed column in a stable state for a long term.

The treatment of a polymerizable compound in the present invention concretely refers to operations using a polymerizable compound in general, such as absorption, distillation, and stripping of a polymerizable compound or a liquid of a polymerizable compound, or extraction of a polymerizable compound. Further, the distillation includes a distilling operation for purifying a crude polymerizable compound, and a distilling operation for separating and removing a certain compound from a liquid containing a polymerizable compound. Here, the polymerizable compound containing liquid refers to liquids containing polymerizable compounds in general, and no particular limitation is imposed on components other than the polymerizable compounds, for instance, regarding kinds of solvents.

In the case where a polymerizable compound is treated with use of the foregoing packed column 20, a polymerizable compound or a liquid containing a polymerizable compound is introduced through the liquid inlet 3 into inside the packed column 20, and the liquid is brought into contact a gas (vapor) introduced through the gas inlet 4, thereafter taken out through the liquid outlet 5.

In treating a polymerizable compound, a polymerization inhibitor such as hydroquinone or phenothiazine, or a molecular oxygen containing gas is preferably employed. Such a polymerization inhibitor or a molecular oxygen containing gas may be mixed with a polymerizable compound or a polymerizable compound containing liquid beforehand, and it may be introduced through the gas inlet 4, for instance. Incidentally, in FIG. 1, a packed column in which two units are provided is taken as an example of the packed column 20 in accordance with the present invention, but the packed column 20 is not limited to this: it may be a packed column having one unit or a plurality of units of not less than two.

The following description will explain in more detail while referring to examples of the present invention and comparative examples. The present invention however is not limited by the following examples.

EXAMPLE 1

In a packed column (distillation column) (inner diameter: 1000 mm) composed of two units as shown in FIG. 1, a corrugated packing support plate that was provided with round holes of an inner diameter of 16 mm each and that had a total opening area of 120% of a column cross-sectional area was provided as a packing support plate, and packings (made of stainless steel) as described below were filled up on the corrugated packing support plate. More specifically, a packing (b) as described below was filled up on the corrugated packing support plate so as to form a packing layer (B), and on the packing layer (B), a packing (a) as described below was filled up so as to form a packing layer (A).

Packing (a):
 Cascade mini ring (trade name: available from Dodwell and Co., Ltd.)
 nominal size: No.2P (voids: 97.7%)
 length of packing layer (A): 3800 mm Packing (b):
 Cascade mini ring (trade name: available from Dodwell and Co., Ltd.)
 nominal size: No.3P (voids: 97.9%)
 length of packing layer (B): 200 mm The length of the packing layer (B) sufficiently exceeded the height of the projection section of the corrugated packing support plate, that is, 150 mm.

A liquid containing a methacrylic acid of a composition expressed as follows was supplied to a middle stage of the foregoing packed column at a rate of 2.3 m$^3$/h, and fractionation was carried out under a column top absolute pressure of 8000 Pa (60 Torr), at a temperature of 75° C., at a reflux ratio of 1.

Composition of methacrylic acid containing liquid
 methacrylic acid 50 percent by weight (wt %)
 methyl methacrylate 46 wt %
 hydroquinone 0.2 wt %

Under the foregoing conditions, the packed column was operated continuously during one year. One year after the start of the continuous operation of the packed column, the inside of the packed column was checked, and no polymerized compound was found in the packing layers (A) and (B) and on the packing support plate.

COMPARATIVE EXAMPLE 1

A packed column arranged identical to that in the foregoing Example 1 except that only the packing (a) used in Example 1 was packed therein was operated in the same manner as that in Example 1. In other words, a packed column shown in FIG. 4, instead of the packed column shown in FIG. 1, was operated in the same manner in that in Example 1.

5 months after the start of the continuous operation of the packed column, a rise of a column bottom pressure was detected. Then, the packed column was opened to be checked. As a result, it was found that about 20 percent of the openings in the packing support plate was plugged, and adhesion of polymerized compounds was recognized in a lower part of about 200 mm in the packing layer (a).

Example 2

A packed column, arranged identical to that in the foregoing Example 1 except that a corrugated packing support plate that had a total opening area of look of a column cross-sectional area was used as the packing support plate, was operated in the same manner as that in Example 1.

6 months after the start of the continuous operation of the packed column, the inside of the packed column was checked, and polymerized compounds were found in a part of recessed portions of the packing support plate.

COMPARATIVE EXAMPLE 2

A packed column arranged identical to that in the foregoing Example 2 except that only the packing (a) used in Example 1 was packed therein was operated in the same manner as that in Example 2. In other words, a packed column shown in FIG. 4, instead of the packed column shown in FIG. 1, was operated in the same manner in that in Example 2.

4 months after the start of the operation of the packed column, a rise of a column bottom pressure was detected, and after further operation of 20 days, the packed column was opened to be checked. As a result, it was found that about 40 percent of the openings in the packing support plate was plugged, and adhesion of polymerized compounds was recognized in a lower part of about 300 mm in the packing layer (a).

Based on the results of the foregoing experiments, it was discovered that provision of the packing layer (B) having a greater percentage of voids than that of the packing layer (A) between the packing support plate and the packing layer (A) ensures effective suppression of polymerization of a polymerizable compound, thereby allowing efficient distillation and the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for treating a polymerizable compound, comprising employing a packed column provided with a packing support plate, a packing layer (A), and a packing layer (B) to absorb, distill and strip a polymerizable compound or a liquid of a polymerizable compound, or extract a polymerizable compound, said packing layer (A) being disposed above the packing support plate, and said packing layer (B) having a greater percentage of voids than that of said packing layer (A) and being disposed between said packing support plate and said packing layer (A).

2. The method as set forth in claim 1, wherein said packing support plate is a corrugated packing support plate.

3. The method as set forth in claim 1, wherein at least either said packing layer (A) or said packing layer (B) includes a packing whose Rmax indicative of a surface roughness according to JIS B0601 is not more than 12.5S.

4. The method as set forth in claim 1, wherein the polymerizable compound is at least one selected from the group consisting of (meth)acrylic acids and esters of the same.

5. The method as set forth in claim 2, wherein:

said packing support plate is a corrugated packing support plate having openings;

a total area of all the openings in said corrugated packing support plate is in a range of 110 percent to 150 percent of a cross-sectional area of said column at a position where the corrugated packing support plate is provided; and an area of each opening is in a range of 25 mm$^2$ to 2000 mm$^2$.

6. The method as set forth in claim 1, wherein the packing layer (B) is provided in a bottom layer of said packed column.

7. The method as set forth in claim 6 wherein a plurality of said packing support plates are provided, and the packing layer (B) is provided in a bottom layer of packing layers above each of said packing support plates.

* * * * *